US009853777B2

(12) United States Patent
Sharma et al.

(10) Patent No.: US 9,853,777 B2
(45) Date of Patent: Dec. 26, 2017

(54) METHOD FOR OPTIMIZING CELL SELECTION IN A DUAL SIM DUAL STANDBY DEVICE

(71) Applicants: Diwakar Sharma, Bangalore (IN); Prasad Basavaraj Dandra, Bangalore (IN); Sudip Sreekumaran Nair, Bangalore (IN); Tushar Vrind, Bangalore (IN)

(72) Inventors: Diwakar Sharma, Bangalore (IN); Prasad Basavaraj Dandra, Bangalore (IN); Sudip Sreekumaran Nair, Bangalore (IN); Tushar Vrind, Bangalore (IN)

(73) Assignee: Samsung Electronics Co., Ltd (KR)

( * ) Notice: Subject to any disclaimer, the term of this patent is extended or adjusted under 35 U.S.C. 154(b) by 0 days.

(21) Appl. No.: 15/092,067

(22) Filed: Apr. 6, 2016

(65) Prior Publication Data

US 2016/0295550 A1    Oct. 6, 2016

(30) Foreign Application Priority Data

Apr. 6, 2015   (IN) ............................ 1809/CHE/2015
Feb. 11, 2016  (IN) ............................ 1809/CHE/2015

(51) Int. Cl.
| | |
|---|---|
| *H04W 4/16* | (2009.01) |
| *H04L 1/18* | (2006.01) |
| *H04W 48/20* | (2009.01) |
| *H04W 68/12* | (2009.01) |
| *H04W 76/02* | (2009.01) |
| *H04W 76/04* | (2009.01) |
| *H04W 8/18* | (2009.01) |

(52) U.S. Cl.
CPC ............. *H04L 1/1825* (2013.01); *H04W 4/16* (2013.01); *H04W 48/20* (2013.01); *H04W 8/183* (2013.01); *H04W 68/12* (2013.01); *H04W 76/025* (2013.01); *H04W 76/026* (2013.01); *H04W 76/048* (2013.01)

(58) Field of Classification Search
CPC ....................................................... H04W 4/16
USPC ........................................ 455/406, 416, 558
See application file for complete search history.

(56) References Cited

U.S. PATENT DOCUMENTS

| | | | | |
|---|---|---|---|---|
| 2013/0157662 A1* | 6/2013 | Han | ...................... | H04W 48/18 455/436 |
| 2013/0329639 A1* | 12/2013 | Wietfeldt | .............. | H04W 88/06 370/328 |
| 2016/0094662 A1* | 3/2016 | Kollu | ................... | H04L 45/745 709/224 |

FOREIGN PATENT DOCUMENTS

WO    WO 2012/140023    10/2012

\* cited by examiner

*Primary Examiner* — Michael T Vu
(74) *Attorney, Agent, or Firm* — The Farrell Law Firm, P.C.

(57) ABSTRACT

A method for optimizing cell selection in a Dual Subscriber Identification Module (SIM) Dual Standby (DSDS) device is provided. The method includes selecting at least one candidate neighbor cell for a first SIM from a mapping table of the DSDS device, the at least one selected candidate neighbor cell corresponding to a cell currently serving a second SIM, wherein the first SIM is out of service and the second SIM is in service, and camping the first SIM onto the at least one selected candidate neighbor cell.

17 Claims, 15 Drawing Sheets

METHOD FOR OPTIMIZING CELL SELECTION IN A DUAL SIM DUAL STANDBY DEVICE

PRIORITY

This application claims priority under 35 U.S.C. §119(a) to Indian Provisional Patent Application Serial No. 1809/CHE/2015 (PS), which was filed on Apr. 6, 2015 in the Indian Intellectual Property Office and assigned, and to Indian Complete Patent Application Serial No. 1809/CHE/2015 (CS), which was filed on Feb. 11, 2016 in the Indian Intellectual Property Office, the entire disclosure of each of these applications is incorporated herein by reference.

BACKGROUND

1. Field of the Disclosure

The present disclosure relates generally to wireless communications systems, and more particularly, to a method and an apparatus for optimizing cell selection in a Dual Subscriber Identity Module (SIM) Dual Standby (DSDS) device.

2. Description of the Related Art

Mobile devices adapted for Multi SIM application are now becoming available to end users. A user benefit of such mobile devices is to be able to receive calls on several subscriptions using a single device. For example, a DSDS device is capable of receiving or sending messages associated with at least two subscriber identities. The two subscriber identities may be associated with the same or different cellular networks, and may use the same or different Radio Access Technologies (RAT). However, there is no network support for the Dual SIM design, hence it becomes a device's responsibility to ensure that the device achieves desired user experience.

In conventional Dual SIM configurations, one SIM (i.e., a First SIM) is in a connected mode (i.e., a Circuit Switched (CS) Call, Packet Switched (PS) Call, Voice over LTE (VOLTE), Voice over HSPA (VOHSPA)), and another SIM (i.e., a Second SIM) is configured to not perform any cell search or measurements and area update procedures. As a result thereof, a network to which the DSDS device belongs has no idea about a proximity of the DSDS device with respect to the second SIM, and eventually the DSDS device loses a context in a serving cell in an idle mode. Thus, the cell selection process can be delayed for the second SIM, which can cause the DSDS device to miss paging messages.

For example, when a CS call is ongoing on the first SIM, and due to a single Radio Frequency (RF) transceiver on the DSDS device, a cell search and measurement cannot be triggered on the second SIM. After CS call disconnection on the first SIM, the cell selection is triggered on the second SIM, thereby leading to a delay in camping onto the cell for the second SIM. Moreover, due to this delay, any paging for the second SIM is missed during the cell selection procedure on the second SIM as shown in FIG. 1A. Further, as shown in FIG. 1B, when the DSDS device is in the connected mode on the first SIM, the context of the second SIM is out of service. Thus, if the call ends on the first SIM, the second SIM initiates a network scan for recovering service on the second SIM, thereby rendering the second SIM unavailable to receive any paging messages and to gain service on the second SIM for a relatively long duration of time.

Moreover, in conventional systems and methods, there is an expected delay in the cell search on the second SIM. For example, after call disconnection on the first SIM, and due to delay in the cell search on the second SIM, the DSDS device can miss any immediate paging on the second SIM. In the DSDS device, after first SIM disconnection, if the stored cell search fails, a blind scan can be triggered, which will again be interrupted by a first SIM IDLE mode high priority operations, e.g., paging and cell reselection. Further, the mechanism for cell selection is sub-optimal, thus there is a potential to improve the cell selection.

The above information is presented herein as merely background information for helping the reader to understand the present invention. Applicants have made no determination and make no assertion as to whether any of the above might be applicable as Prior Art with regard to the present application.

SUMMARY

Aspects of the present disclosure have been made to address at least the above-mentioned problems and/or disadvantages and to provide at least the advantages described below.

Accordingly, an aspect of the present disclosure is to provide a mechanism for optimizing cell selection in a DSDS device.

Another aspect of the present disclosure is to provide a mechanism for selecting at least one candidate neighbor cell for a first SIM from a mapping table including at least one candidate neighbor cell corresponding to a cell currently serving a second SIM, wherein the first SIM is out of service and the second SIM is in service.

Another aspect of the present disclosure is to provide a mechanism for camping the first SIM onto the at least one selected candidate neighbor cell.

Another aspect of the present disclosure is to provide a mechanism for selecting the at least one candidate neighbor cell for the first SIM during a gap allocated to the second SIM, wherein the first SIM is out of service and the second SIM is in service.

Another aspect of the present disclosure is to provide a mechanism for sharing a RF transceiver with the second SIM, while area update procedure is ongoing on the first SIM.

Another aspect of the present disclosure is to provide a mechanism for devising a polling occasion for the second SIM based on a DRX period of the second SIM and the instantaneous or statistical signal or bearer conditions on the first SIM.

In accordance with an aspect of the present disclosure, there is provided a method for optimizing cell selection in a DSDS device. The method includes selecting at least one candidate neighbor cell for a first SIM from a mapping table of the DSDS device, the at least one selected candidate neighbor cell corresponding to a cell currently serving a second SIM, wherein the first SIM is out of service and the second SIM is in service, and camping the first SIM onto the at least one selected candidate neighbor cell.

In accordance with an aspect of the present disclosure, there is provided a method for optimizing cell selection in a DSDS device, the method includes selecting at least one candidate neighbor cell for a first SIM during a gap allocated to a second SIM, wherein the first SIM is out of service and the second SIM is in service, and camping the first SIM onto the at least one selected candidate neighbor cell.

In accordance with an aspect of the present disclosure, there is provided a DSDS device for optimizing cell selection. The DSDS device includes a controller unit configured to select at least one candidate neighbor cell for a first SIM from a mapping table of the DSDS device, the at least one selected candidate neighbor cell corresponding to a cell currently serving a second SIM, wherein the first SIM is out of service and the second SIM is in service, and camp the first SIM onto the at least one selected candidate neighbor cell.

In accordance with an aspect of the present disclosure, there is provided a DSDS device for optimizing cell selection. The DSDS device includes a controller unit configured to select at least one candidate neighbor cell for a first SIM during a gap allocated to a second SIM, wherein the first SIM is out of service and the second SIM is in service, and camp the first SIM onto the at least one selected candidate neighbor cell.

In accordance with an aspect of the present disclosure, there is provided a DSDS device for optimizing a paging reception. The DSDS device includes a controller unit configured to determine whether data on a signaling bearer radio link entity associated with a first SIM is one of available and unavailable and instruct to one of switch a Radio Frequency (RF) transceiver to read a paging message on the second SIM when the data is unavailable and skip switching of the RF transceiver from the first SIM to the second SIM when the data is available.

In accordance with an aspect of the present disclosure, there is provided a non-transitory computer readable storage medium having stored thereon computer executable program instructions that when executed perform a method for optimizing cell selection in a DSDS device. The method includes selecting at least one candidate neighbor cell for a first SIM from a mapping table of the DSDS device, the at least one selected candidate neighbor cell corresponding to a cell currently serving a second SIM, wherein the first SIM is out of service and the second SIM is in service, and camping the first SIM onto the at least one selected candidate neighbor cell

BRIEF DESCRIPTION OF THE DRAWINGS

The above and other aspects, features, and advantages of certain embodiments of the present disclosure will be more apparent from the following detailed description taken in conjunction with the accompanying drawings, in which.

DETAILED DESCRIPTION

Figure 1A:
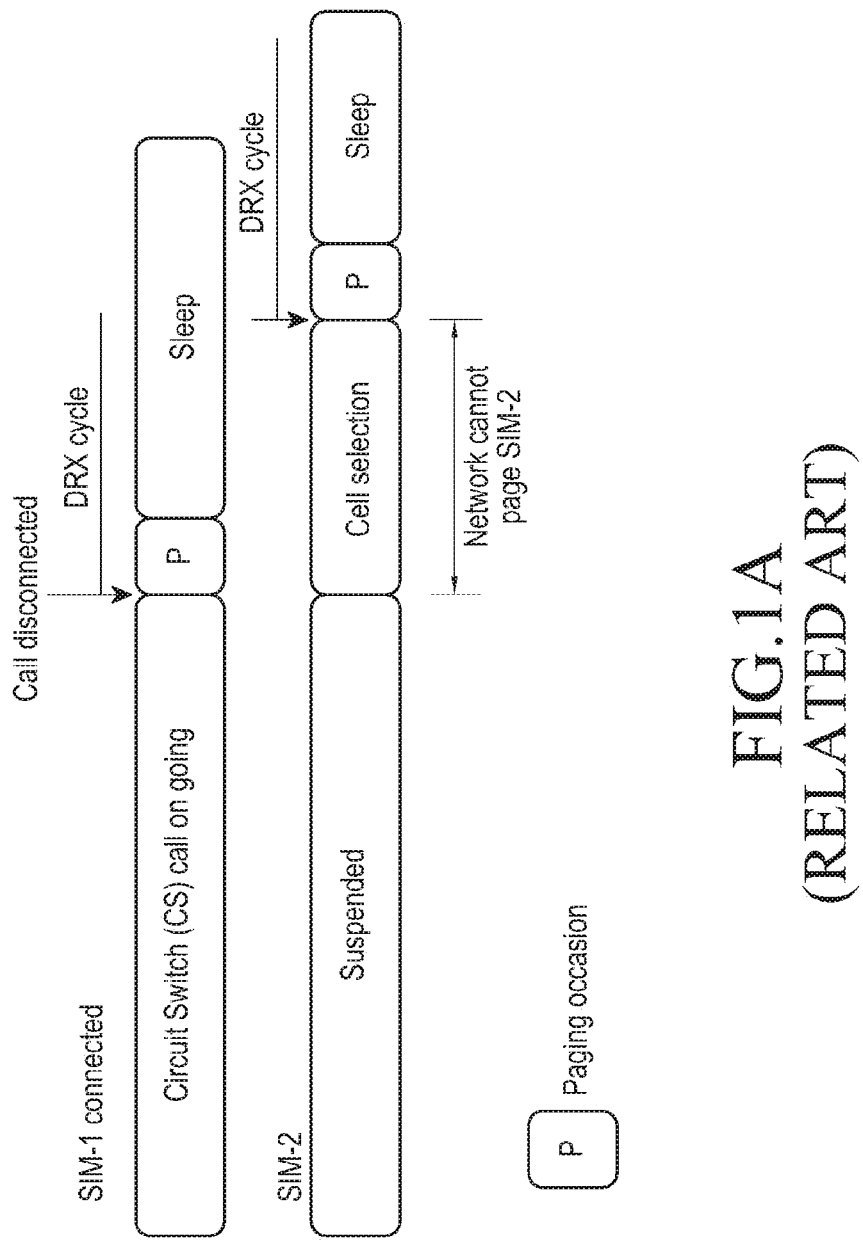
FIGS. 1A and 1B are diagrams illustrating a conventional cell selection mechanism in a DSDS device.
Figure 1B:
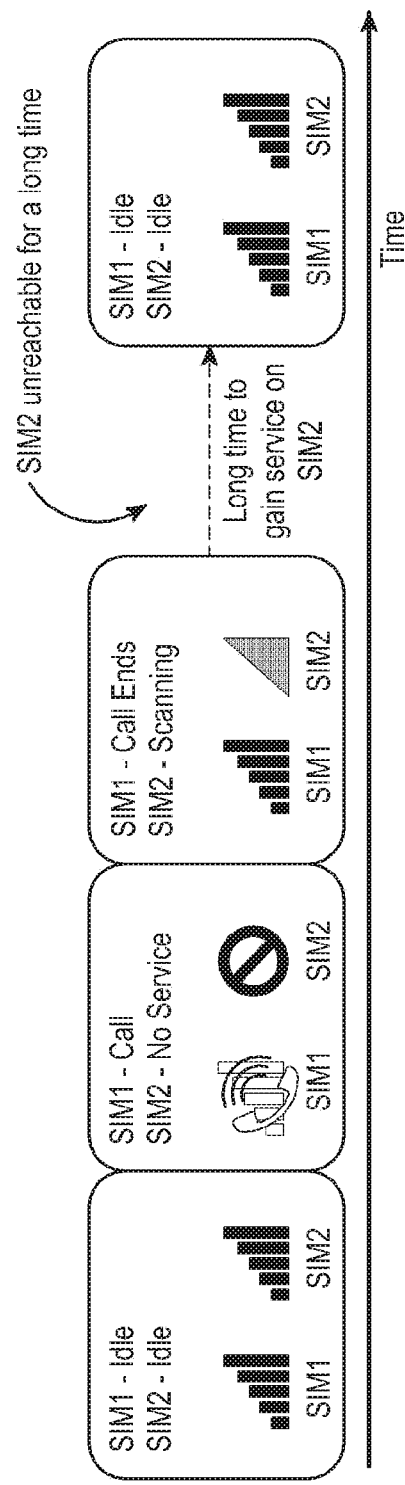

The embodiments described herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the present disclosure. Also, the various embodiments described herein are not necessarily mutually exclusive, as some embodiments can be combined with one or more other embodiments to form new embodiments. The term "or" as used herein, refers to a non-exclusive or, unless otherwise indicated. The examples used herein are intended merely to facilitate an understanding of ways in which the embodiments herein can be practiced and to further enable those skilled in the art to practice the embodiments herein. Accordingly, the examples should not be construed as limiting the scope of the present invention.

The embodiments herein disclose a method for sharing an RF transceiver with a second SIM, while an area update procedure is ongoing on a first SIM. A polling occasion is devised for the second SIM based on a DRX period of the second SIM and the instantaneous or statistical signal or bearer conditions on the first SIM. The polling time to the second SIM can be derived on the radio condition of the first SIM. So that the connected mode paging should not impact the communication on the first SIM, the polling occasion should consider Paging_Type-1 occasion on the first SIM and accepting Paging_Type-2 at any occasion and holding the radio link with best efforts. In the proposed method, a tradeoff between paging reception at the second SIM and NAS signaling at the first SIM can be present. In order to give priority to the NAS signaling, an additional offset can be added to defer measurement and delay cell reselection. As per current 3GPP standards, the DSDS device has to measure frequencies and RAT with lower priority in the following fashion.

As per current 3GPP design, User Equipment (UE) has to be able to measure frequencies and RAT with lower priority, as disclosed below:

A) The DSDS device has to perform intra-frequency measurement only when cell Selection receive Level value (SrxLev) of the serving cell is less than or equal to (i.e., meets) a threshold for intra-frequency measurement (Sintrasearch) and when the DSDS device has to perform lower or equal priority inter-frequency/interRAT measurement only when the SrxLev of the serving cell is less than or equal to (i.e., meets) a threshold for non intra-search frequency measurement (Snonintrasearch).

B) While reading paging on the second SIM, an additional threshold could be added in order to defer measurement on the second SIM, while NAS signaling is active on the first SIM. This additional offset indirectly adds a priority to NAS signaling. A cell selection DSDS offset value (Sdsds_off) could be added to the Sintrasearch and the Snonintrasearch in order to defer the measurement on the second SIM when reading paging, while NAS signaling was active on the first SIM.

There would be an expected delay in cell search on the second SIM after call disconnection on the first SIM. After call disconnection, due to delay in the cell search on the second SIM, the DSDS device would miss any immediate paging messages on the second SIM. Further, in the DSDS device, after first SIM disconnection, if the stored cell search fails then, a blind scan will be triggered which will again be interrupted by the first SIM idle mode high priority operations, e.g., paging and cell reselection.

The proposed method(s) described herein provides a mechanism for scheduling measurements in the DSDS device for minimizing missed paging scenarios. Further, the proposed method(s) provides a mechanism for the second SIM to perform cell selection in a background when the call is ongoing on the first SIM and keep the cell list prepared with an updated tracking area before the call gets disconnected on the first SIM.

A predefined mapping between a serving cell of the first SIM and a serving cell of the second SIM is maintained in the DSDS device to interpolate the serving cell of the second SIM based on the first SIM cell selection or reselection. Further, the first SIM utilizes compressed mode GAP on the second SIM to complete the measurements on the first SIM.

Referring now to the drawings, and more particularly to FIGS. 2A through 15, where similar reference characters denote corresponding features consistently throughout the figures, there are shown preferred embodiments.

Figure 2A:
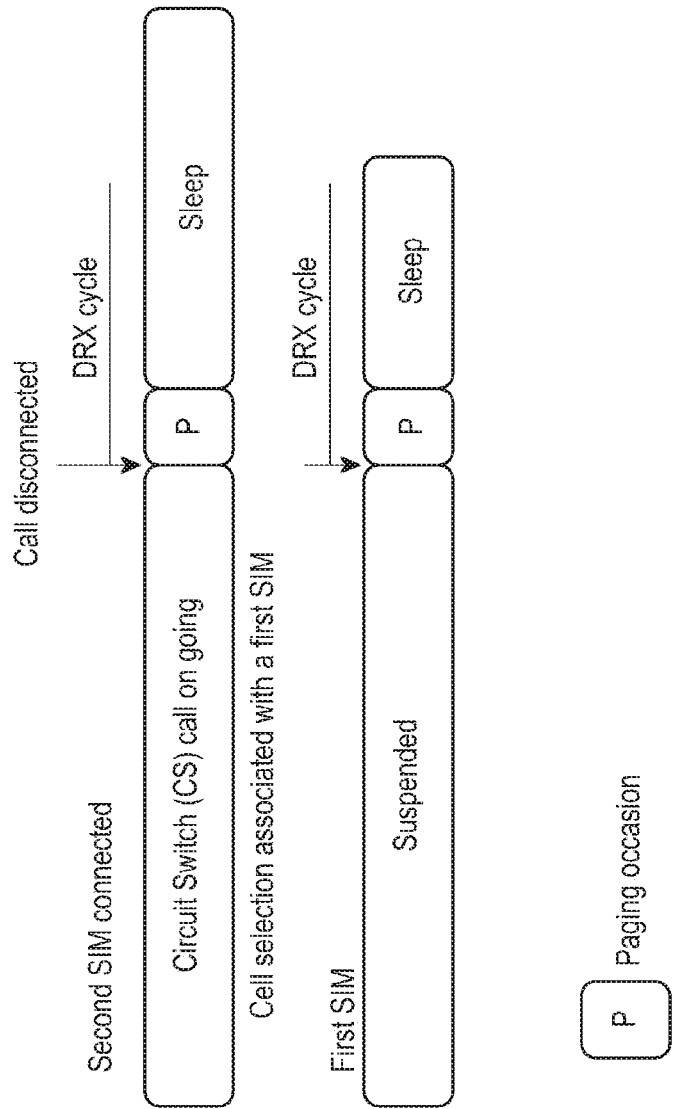
FIGS. 2A and 2B are diagrams illustrating a mechanism for performing cell selection on a first SIM in a DSDS device, according to an embodiment of the present disclosure.
Figure 2B:
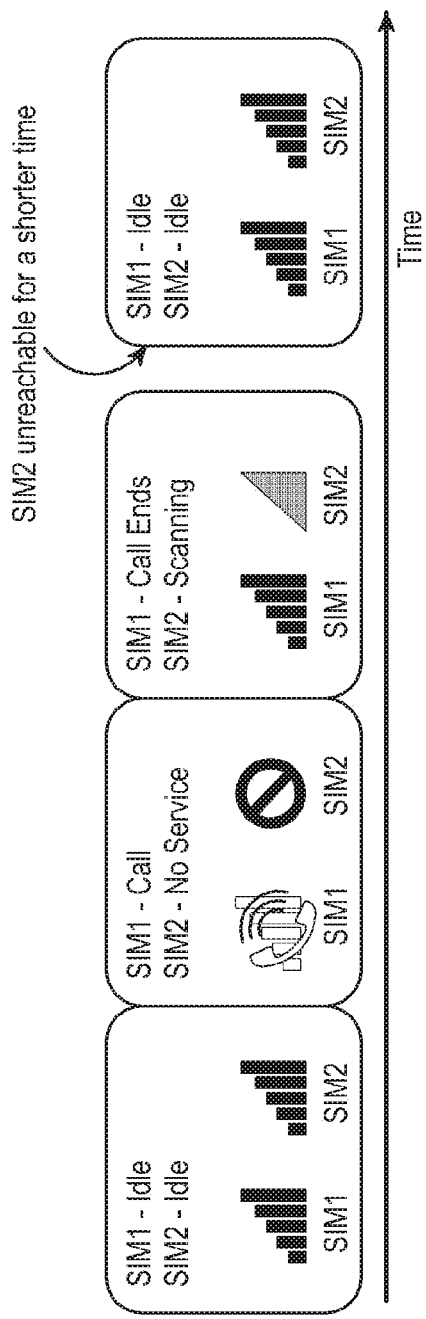

FIGS. 2A and 2B are diagrams illustrating a mechanism for performing a cell selection on a first SIM in a DSDS device, according to an embodiment of the present disclosure.

As shown in the FIG. 2A, consider a scenario where a Circuit Switched (CS) call, a VOLTE call, a VOHSPA call, or a Packet Switched (PS) call is ongoing on a second SIM and the first SIM is in a suspended condition, i.e., idle mode. During the ongoing CS call, the DSDS device selects at least one candidate neighbor cell for the first SIM from a mapping table of the DSDS device. The at least one selected candidate neighbor cell corresponds to a cell currently serving a second SIM, where the first SIM is out of service and the second SIM is in service. The mapping table is created based on network information relating to the second SIM that is mapped to possible coverage information on the first SIM. A detailed description of creating the mapping table is explained in with reference to FIG. 5.

After a CS call disconnection on the second SIM, the first SIM is camped onto the selected candidate neighbor cell, thereby providing a context based cell selection and minimizing the cell search time by using the mapping table. As shown in the FIG. 2B, when the DSDS device is on call on the second SIM, the first SIM is Out-of-Service. After a call disconnection on the second SIM, the first SIM initiates a quick network scan to recover service on the first SIM by selecting the candidate neighbor cell associated with the first SIM from the mapping table.

The proposed method enables faster acquisition of the candidate neighbor cell on the first SIM to camp onto the candidate neighbor cell after a call disconnection on the second SIM.

Figure 3A:
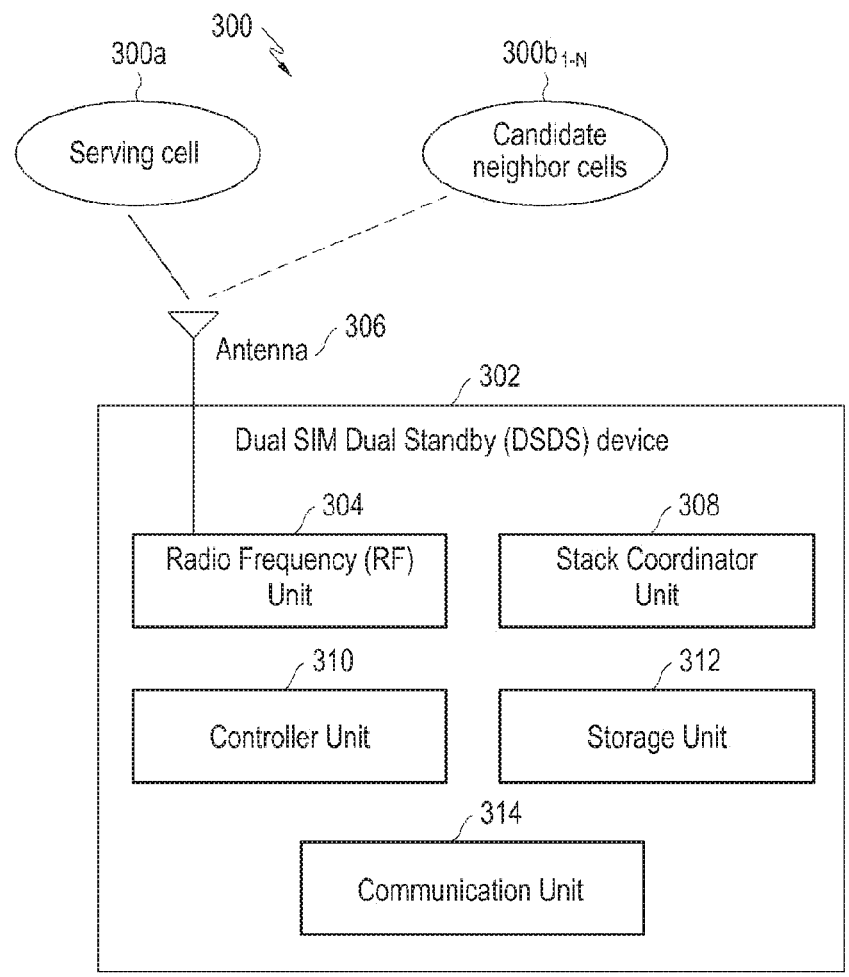
FIG. 3A is a diagram illustrating various units in the DSDS device for optimizing cell selection, according to an embodiment of the present disclosure.
Figure 3B:
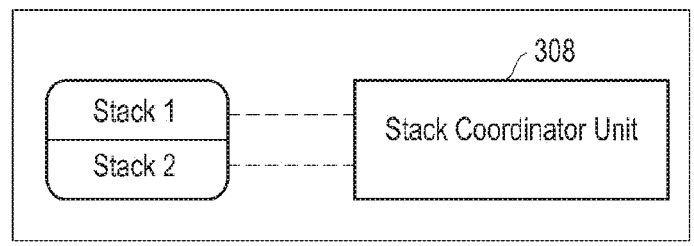
FIG. 3B is a diagram illustrating a stack coordinator unit, according to an embodiment of the present disclosure.

FIG. 3A is a diagram illustrating a wireless communication system 300 for optimizing cell selection in a DSDS device 302, according to an embodiment of the present disclosure. The wireless communication system 300 includes a serving cell 300a which is associated with a second SIM, neighbor cell(s) $300b_{1-N}$ (hereinafter referred to as neighbor cell(s) 300b) associated with the first SIM, and the DSDS device 302.

The DSDS device 302 can have layered software architecture to communicate with the serving cell 300a and the candidate neighbor cell 300b associated with SIMs. The software architecture for the DSDS device 302 can have multiple protocol stacks, each of which may be associated with a separate SIM.

The serving cell 300a and the candidate neighbor cell 300b described herein can correspond to, for example, but not limited to, a GSM EDGE Radio Access Network (GERAN), a UMTS Radio Access Network (UTRAN), Evolved UTRAN (EUTRAN), or any other network. The serving cell 300a and the candidate neighbor cell 300b can belong to same network operator or a different network operator.

The DSDS device 302 includes an RF unit 304 that is coupled with an antenna 306, a stack coordinator unit 308, a controller unit 310, a storage unit 312, and a communication unit 314. The RF unit 304 receives RF signals from the antenna 306 and converts the received RF signals to baseband signals. The RF unit 304 also converts received baseband signals to RF signals, and sends out to the RF signals via the antenna 306. The stack coordinator unit 308 includes two stacks associated with two SIMs namely the first SIM and the second SIM, which share a single RF transceiver from the RF unit 304.

The controller unit 310 can be configured to select the candidate neighbor cell 300b for the first SIM from the mapping table including the candidate neighbor cell corresponding to the cell currently serving the second SIM (i.e., serving cell 300a), where the first SIM is out of service and the second SIM is in service. The mapping table is created by the DSDS device 302 based on a historic mobility pattern associated with the first SIM or the second SIM. A detailed description of creating the mapping table is explained with reference to FIG. 5.

The mapping table can be received by the DSDS device 302 from at least one neighbor device when the DSDS device 302 is in an idle mode or a connected mode. The DSDS device 302 connects with the neighbor device to receive the mapping table using a short range communication. A detailed description of receiving the mapping table from the neighbor device(s) is explained with reference to FIG. 6 (i.e., single hopping) and with reference to FIG. 7 (i.e., multi-hopping).

The controller unit 310 can be configured to camp the first SIM onto the selected candidate neighbor cell. The candidate neighbor cell can be selected from among the candidate neighbor cells 300*b* to camp the first SIM. The candidate neighbor cell can be a serving cell of the first SIM after a communication activity associated with the second SIM is completed.

The controller unit 310 can be configured to select the candidate neighbor cell 300*b* for the first SIM during a gap allocated to the second SIM, where the first SIM is out of service and the second SIM is in service. The gap is a measurement GAP, a compression mode GAP, or an artificial GAP. The DSDS device 302 creates the artificial GAP after determining whether statistics of Hybrid Automatic Repeat Request (HARQ) Non-Acknowledgement (NACK) is within a Block Error Rate (BLER) threshold, wherein the artificial GAP maintains retransmission within the BLER threshold (i.e., the BLER is inversely proportional to an artificial GAP time). The controller unit 310 can be configured to camp the first SIM onto the selected candidate neighbor cell. A detailed description of the compressed mode GAP is explained with reference to FIG. 9. Further, a detailed description of the artificial GAP is explained with reference to FIG. 10.

The storage unit 312 stores the created mapping table in which the network information on the second SIM is mapped to possible coverage information on the first SIM. The storage unit 312 may include one or more computer-readable storage media. The storage unit 312 may include non-volatile storage elements. Examples of such non-volatile storage elements may include magnetic hard discs, optical discs, floppy discs, flash memories, or forms of Electrically Programmable Memories (EPROM) or Electrically Erasable and Programmable (EEPROM) memories. In addition, the storage unit 312 may, in some examples, be considered a non-transitory storage medium. The term "non-transitory" may indicate that the storage medium is not embodied in a carrier wave or a propagated signal. However, the term "non-transitory" should not be interpreted that the storage unit 312 is non-movable. The storage unit 312 can be configured to store larger amounts of information than the memory. A non-transitory storage medium may store data that can, over time, change (e.g., in Random Access Memory (RAM) or cache). The communication unit 314 can be configured for communicating internally between the units and externally with the networks.

Figure 4:
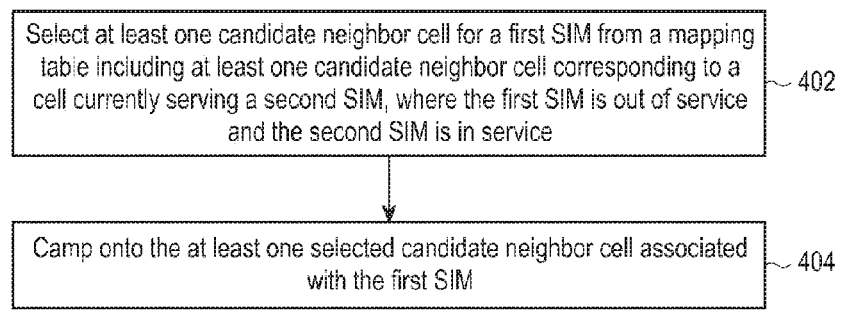
FIG. 4 is a flowchart illustrating a method for optimizing the cell selection in the DSDS device, according to an embodiment of the present disclosure.

FIG. 4 is a flowchart illustrating a method for optimizing the cell selection in the DSDS device 302, according to an embodiment of the present disclosure. At step 402, the controller unit 310 selects the candidate neighbor cell 300*b* for the first SIM from the mapping table, where the first SIM is out of service and the second SIM is in service.

The mapping table is created by the DSDS device 302 based on the historic mobility pattern associated with the first SIM and the second SIM. A detailed description of creating the mapping table is explained with reference to FIG. 5. The DSDS device 302 connects with the at least one neighbor device to receive the mapping table using short range communication. The short range communication can be any communication means available for Device-to-Device (D2D) communication such as Wireless Fidelity (Wi-Fi), Bluetooth or a cellular communication including LTE etc. A detailed description of receiving the mapping table from the neighbor device(s) is explained with reference to FIG. 6 (i.e., single hopping) and with reference to FIG. 7 (i.e., multi-hopping).

At step 404, the controller unit 310 camps the first SIM onto the selected candidate neighbor cell. The candidate neighbor cell 300*b* can be the serving cell of the first SIM after the communication activity associated with the second SIM is completed.

The various actions, acts, blocks, steps, or the like described with reference to the method of FIG. 4 (and the methods hereinafter described with respect to the other FIGs.) may be performed in the order presented, in a different order or simultaneously. Further, some of the actions, acts, blocks, steps, or the like may be omitted, added, modified, skipped, or the like without departing from the scope of the invention.

Figure 5:
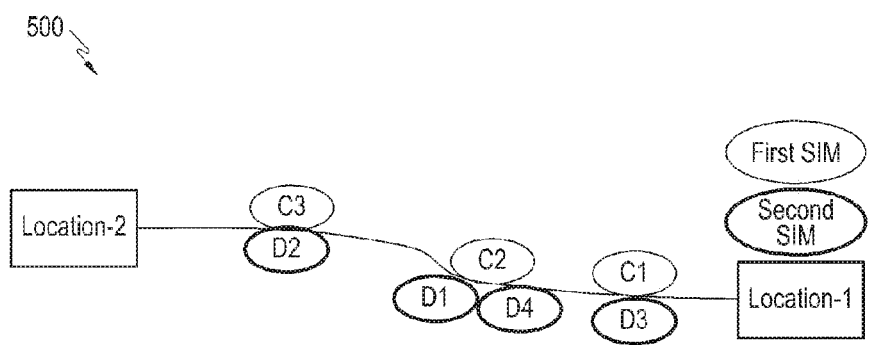
FIG. 5 is a diagram illustrating a system of creating the mapping table between the serving cells of the second SIM to a cell of the first SIM, according to an embodiment of the present disclosure.

FIG. 5 is a diagram illustrating a system 500 of creating the mapping table between the serving cells of the second SIM to the cell of the first SIM, according to an embodiment of the present disclosure. Informatics study shows that 80% of users are either static or follow very slow mobility. Every user of the DSDS device 302 follows a set of paths during the day, or follows a set location pattern on a weekly basis. Further, the path or paths a user travels during mobility can be limited.

As shown in the FIG. 5, consider a scenario where the user is following the path from a location-1 to a location-2. During mobility, in the idle mode, the DSDS device 302 tracks the serving cell of the second SIM and the candidate neighbor cells of the first SIM (as during a normal course of operation of a DRX cycle, paging tracking area update(s) will be ongoing operation).

Further, the DSDS device 302 creates the database with the mapping table. During mobility, the serving cell of the second SIM corresponding to the candidate neighbor cell of the first SIM is tracked and stored in the mapping table in the database. The mapping table will be updated as per the mobility of the user in the idle mode. The created mapping table can be used for performing intelligent cell selection on the first SIM after the call is disconnected on the second SIM. The example mapping table is shown below in Table-1, where the serving cells of the second SIM are mapped to the corresponding candidate neighbor cells of the first SIM along the path as shown in the FIG. 5.

TABLE 1

| Serving cells of the second SIM | Candidate neighbor cells of the first SIM |
|---|---|
| C1 | D3 |
| C2 | D1, D4 |
| C3 | D2 |

As shown in Table-1, the serving cell "C1" of the second SIM is mapped to the candidate neighbor cell "D3" of the first SIM. The serving cell "C2" of the second SIM is mapped to the candidate neighbor cells "D1" and "D4" of the first SIM. The serving cell "C3" of the second SIM is mapped to the candidate neighbor cell "D2" of the first SIM.

Figure 6:
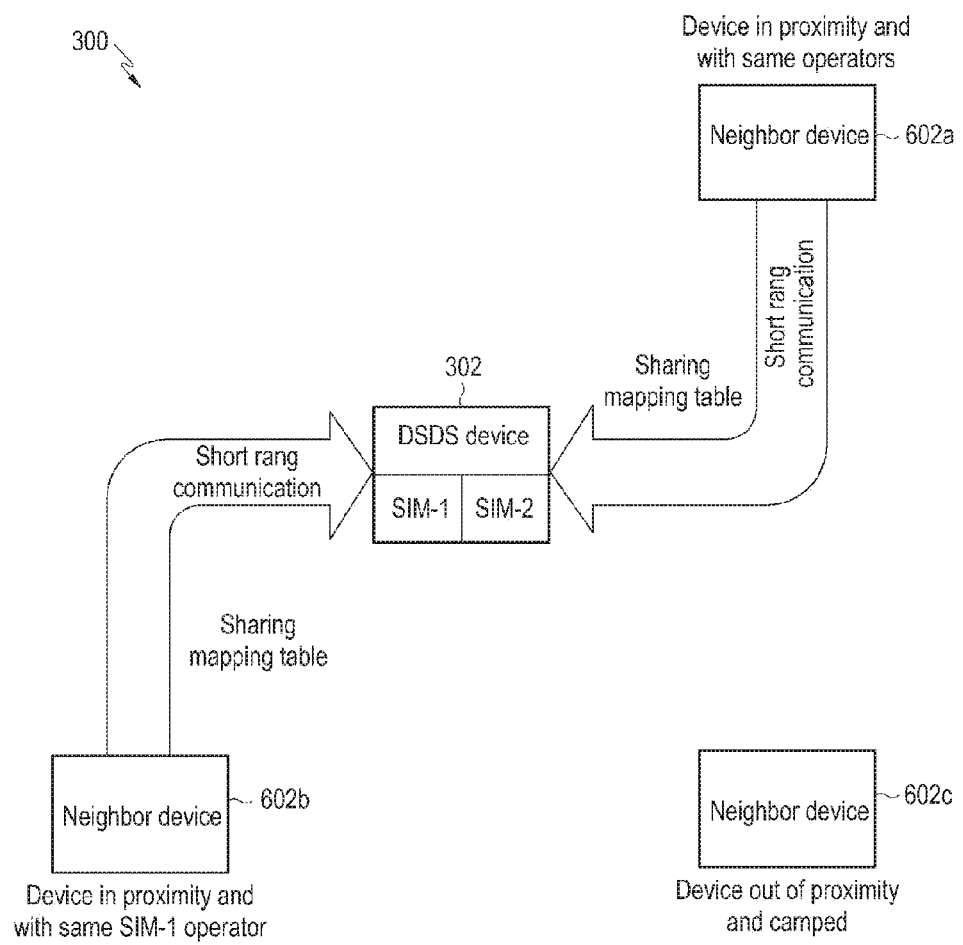
FIG. 6 is a diagram illustrating a wireless communication system for receiving a mapping table from a nearby neighbor devices, according to an embodiment of the present disclosure.

FIG. 6 is a diagram illustrating a wireless communication system 600 for receiving the mapping table from nearby neighbor devices, according to an embodiment of the present disclosure. The wireless communication system 600 includes the DSDS device 302, a neighbor device 602*a*, a neighbor device 602*b*, and a neighbor device 602*c*.

Consider a scenario where the call is initiated on the second SIM. After initiating the call, the DSDS device 302 scans for all nearby neighbor devices which are in proximity. The DSDS device 302 determines the neighbor device 602a in proximity and with same operators of the first SIM and the second SIM. After determining the neighbor device 602a in proximity, the DSDS device 302 establishes a connection with the neighbor device 602a using the short range communication. The DSDS device 302 determines the neighbor device 602b in proximity and with same operator of the first SIM. The DSDS device 302 establishes a connection with the neighbor device 602b using the short range communication. The DSDS device 302 will not establish the connection with the neighbor device 602c, as the neighbor device 602c is out of proximity.

During the ongoing call, at regular intervals, the DSDS device 302 receives (or collects) the serving cell and the candidate neighbor cell information (i.e., mapping data) from the neighbor device 602a and the neighbor device 602b; and keeps updating the mapping table in the database for the first SIM. The current serving cell and the candidate neighbor cell can be fetched from the neighbor device 602a and the neighbor device 602b through the short range communication such as Wi-Fi or any other D2D communication methods for the first SIM. Further, when the call is disconnected on the second SIM, the collected information can be used for cell selection on the first SIM.

When the second SIM is in the connected mode, the DSDS device 302 collects the serving cell and the candidate neighbor cell information of the first SIM and updates the mapping table in the database provided the neighbor devices has at least one operator same as the first SIM.

Figure 7:
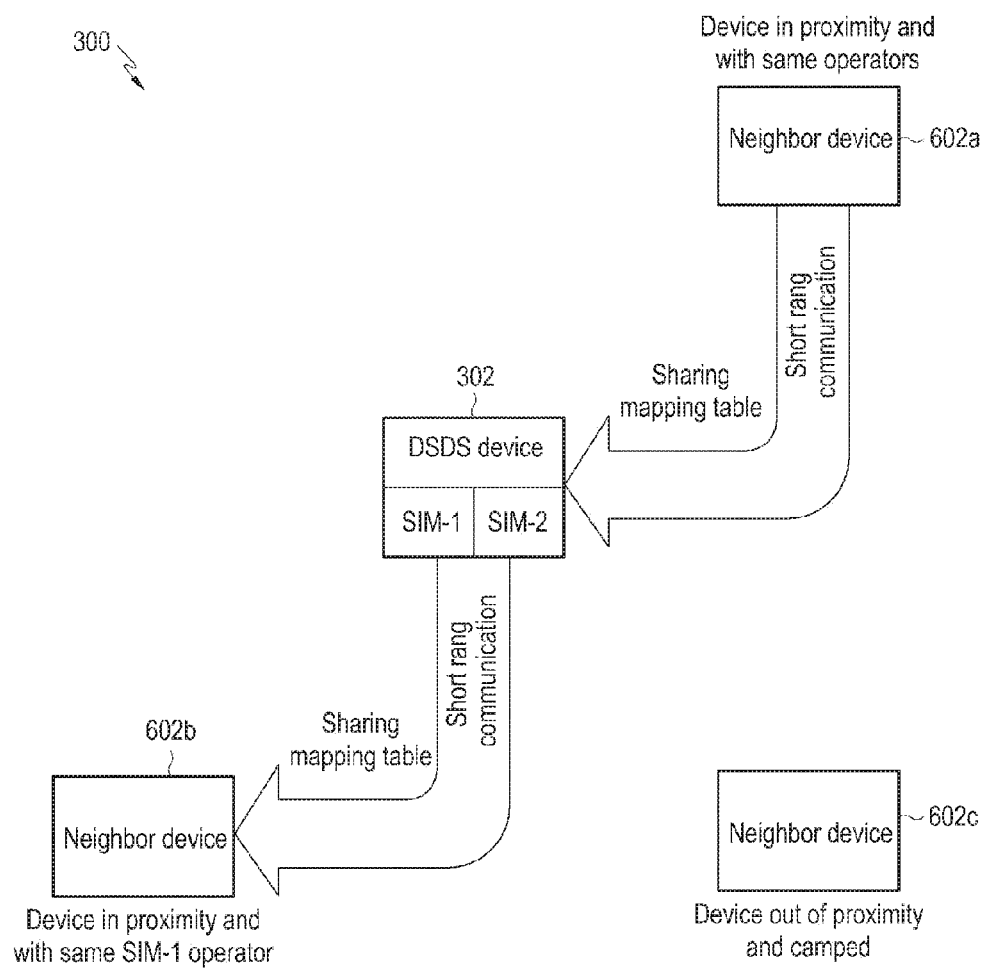
FIG. 7 is a diagram illustrating the wireless communication system for receiving the mapping table from the nearby neighbor devices, according to an embodiment of the present disclosure.

FIG. 7 is a diagram illustrating the wireless communication system 300 for receiving the mapping table from nearby neighbor devices, according to an embodiment of the present disclosure. The wireless communication system 600 includes the DSDS device 302, the neighbor device 602a, the neighbor device 602b, and the neighbor device 602c.

As shown in the FIG. 7, the neighbor device 602a is in proximity to the DSDS device 302 with the same operators of the first SIM and the second SIM. A connection is established between the DSDS device 302 and the neighbor device 602a using short range communication. Further, the DSDS device 302 is in proximity to the neighbor device 602b, which is with same operator of the first SIM. A connection is established between the DSDS device 302 and the neighbor device 602b using short range communication; the neighbor device 602c is out of proximity.

During idle mode, the neighbor device 602a shares the mapping table with the DSDS device 302 in a collaborative manner. The DSDS device 302 can be configured to share the mapping table with the neighbor device 602b. The neighbor devices in general will share their mapping tables with the devices in proximity. The mapping table includes one-to-one or one-to-many mapping for serving cells in an operator-1 of the second SIM to the neighbor cells belonging to an operator-2 of the first SIM. The example mapping table is shown in Table-1 as described above.

The information in the mapping table can be used to map the serving cells of the second SIM to the corresponding candidate neighbor cells of the first SIM for fast camping after call disconnection on the second SIM. The mapping table can be trained and prepared over a time period when the first SIM and the second SIM are in idle mode or in the connected mode. Unlike conventional mechanisms, the DSDS device 302 collects the mapping table from the neighbor devices which are in proximity in the collaborative manner and uses the information in the mapping table provided both the operator match.

Unlike conventional mechanisms, in the D2D communication enabled scenario, using Wi-Fi or any other D2D methods, the nearby devices can share the Absolute Radio Frequency Channel Number (ARFCN) mapping tables or serving cell and neighbor cell information, which can be used to select the best available neighbor cell.

Figure 8:
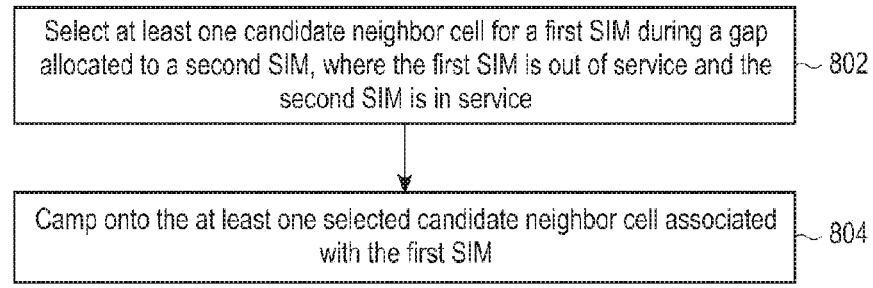
FIG. 8 is a flowchart illustrating a method for optimizing the cell selection in the DSDS device, according to an embodiment of the present disclosure.

FIG. 8 is a flowchart illustrating a method for optimizing the cell selection in the DSDS device 302, according to an embodiment of the present disclosure. At step 802, the controller unit 310 selects the candidate neighbor cell 300b associated with the first SIM during the GAP allocated to the second SIM, where the first SIM is out of service and the second SIM is in service.

The GAP is the measurement GAP (i.e., the BLER which is inversely proportional to the artificial GAP time), the compression mode GAP, or the artificial GAP. The DSDS device 302 creates the artificial GAP after determining that statistics of HARQ NACK are within the BLER threshold, where the artificial gap maintains retransmission within said BLER threshold. A detailed description of the compressed mode GAP is explained with reference to FIG. 9. Further, a detailed description of the artificial GAP is explained with reference to FIG. 10.

At step 804, the controller unit 310 camps the first SIM onto the selected candidate neighbor cell.

Figure 9:
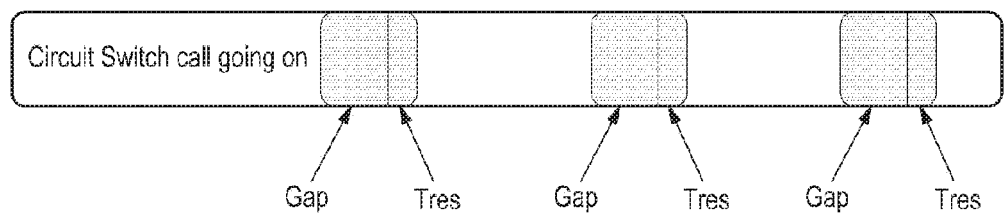
FIG. 9 is a diagram illustrating a method for performing a cell selection in a compressed mode GAP of the second SIM, according to an embodiment of the present disclosure.

FIG. 9 is a diagram illustrating a method for performing the cell selection in the compressed mode GAP of the second SIM, according to an embodiment of the present disclosure. In connected mode, 3GPP supports the compressed mode GAP pattern to support inter-frequency measurements.

As shown in the FIG. 9, if the network deployment is not dense (or crowded), the allocated GAP to the second SIM provides some "residual time" called "Tres;" this time can be used to select the candidate neighbor cell 300b associated with the first SIM during the GAP allocated to the second SIM. The residual time "Tres" can be used to trigger measurements for the first SIM. As the call is in progress on the second SIM, the DSDS device 302 does not receive and read the paging channel for the first SIM. During this time, only measurements will be performed for the first SIM.

As per the current Long Term Evolution (LTE) measurement GAP structure, some of the measurement GAP length (MGL=6 ms) can be used for the first SIM frequency search. As described above, if the deployment is not dense, the residual time "Tres" could be created to perform measurement for first SIM.

Table-2 shows the values of the measurement GAP length, the measurement GAP repetition period, measurement purpose or the like.

TABLE 2

| GAP pattern ID | Measurement GAP length (ms) | Measurement Gap repetition period (ms) | Minimum available time for inter-frequency and inter-RAT measurements during 480 ms period (ms) | Measurement purpose |
|---|---|---|---|---|
| 0 | 6 | 40 | 60 | Inter-frequency E-UTRAN FDD and TDD, UTRAN FDD, GERAN, LCR TDD, HRPD, CDMA2000 1x |
| 1 | 6 | 80 | 30 | Inter-frequency E-UTRAN FDD and TDD, UTRAN FDD, GERAN, LCR TDD, HRPD, CDMA2000 1x |

The residual time in the compressed mode GAPs are used for performing cell selection for the first SIM. The compressed mode is enabled based on the cell specific reference signal measurements on the serving cell and will not be allocated to the DSDS device 302, thereby creating a problem during the good reference signal measurement on the second SIM, where the network will not allocate GAP's. In such cases, the DSDS device 302 needs to create artificial GAP's, as explained in FIG. 10, to measure the reference signal power on the second SIM serving cell and still ensure that QOS supported on the bearer on the first SIM should not suffer re-transmission.

Figure 10:
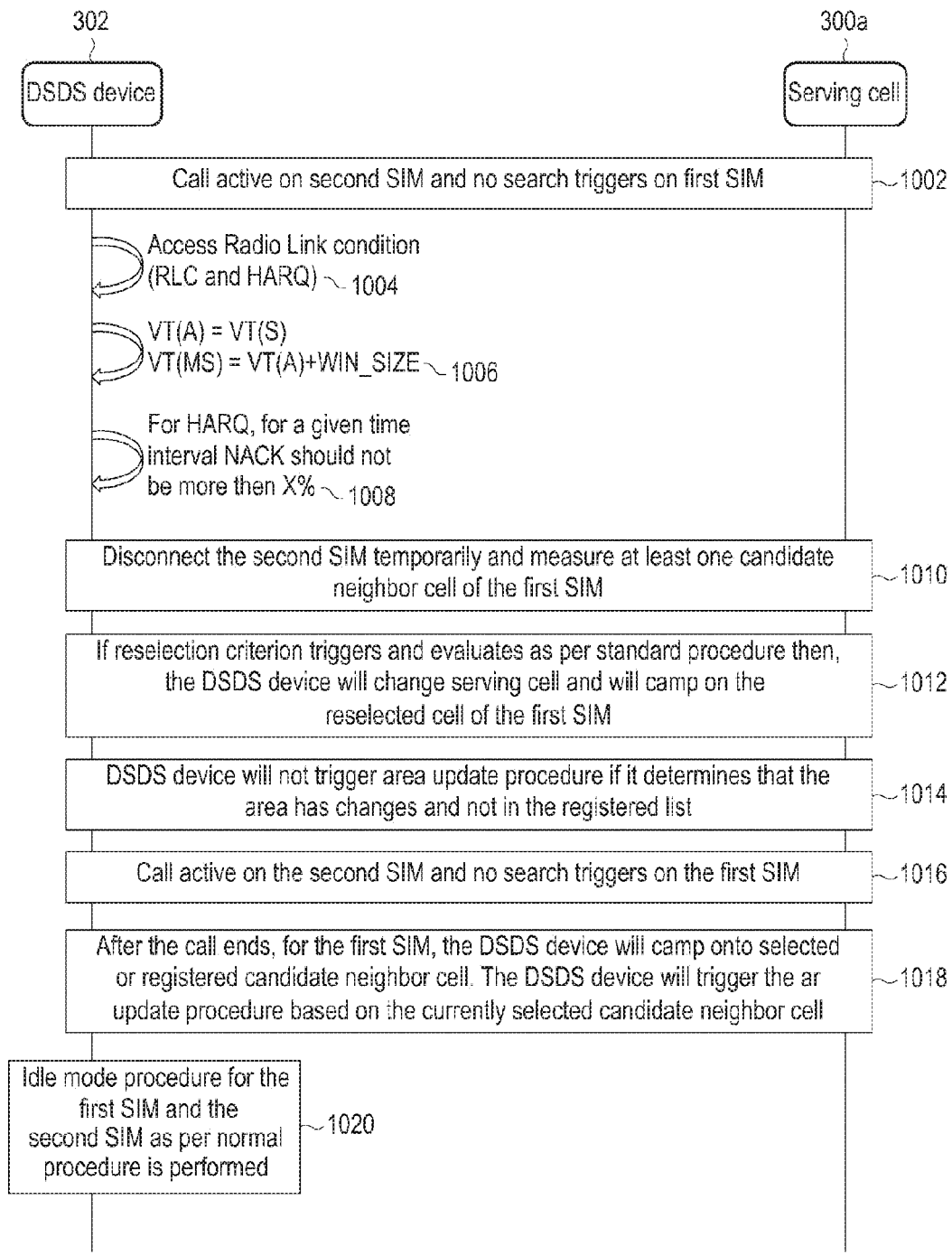
FIG. 10 is a sequence diagram illustrating a method for creating a virtual gap for cell selection, according to an embodiment of the present disclosure.

FIG. 10 is a sequence diagram for creating a virtual gap for cell selection, according to an embodiment of the present disclosure. The signaling sequence depicts communication between the DSDS device 302 and the serving cell 300a. As per the radio link standards, 10% BLER is allowed and if the radio link is good and enough to keep the BLER at 0%, a mimic 10% re-transmission would not hurt the QOS.

At step 1002, the DSDS device 302 is in the connected mode, where the call is active on the second SIM and no cell search triggers on the first SIM.

At step 1004, during the ongoing call, the DSDS device 302 accesses the radio link condition by evaluating the RLC entities and its state variables to ensure flow control is smooth and no re-transmission is reported. The HARQ NACK statistics are also checked to ensure that no re-transmission is reported.

At step 1006, during radio link condition evaluation, the DSDS device 302 measures transmission window VT_A (which holds the value of the sequence number of the next Acknowledged Mode Data protocol data unit (PDU) (AM Mode PDU) for which a positive acknowledgment is to be received) should be equal to in-sequence VT_S (state variable holds the value of the sequence number to be assigned for the next newly generated AM mode PDU). So, VT(A) =VT(S) state, which is the health or quality of the radio condition, where a transmitted packet has been acknowledged and no retransmission is done at the RLC layer. VT (MS) serves as the higher edge of the transmitting window and is equal to VT_S+WIN_SIZE, which states that all packets are acknowledged and no window space has been utilized by the re-transmission.

At step 1008, after identifying the health of radio link at the RLC level, at the MAC layer data packets are protected by HARQ, any errors in transmission results in HARQ_NACK at the MAC layer and HARQ retransmission % for all HARQ process is not less than 10% in order to disconnect the second SIM temporarily and measure at least one neighbor cell. To measure the RX (reception/receiver), generated NACK on each HARQ process after decoding is not less than 10% in order to the disconnect the second SIM temporarily and measure at least one neighbor cell.

At step 1010, the DSDS device 302 stops the transmission and triggers the measurement on the first SIM. The second SIM is disconnected temporarily and selects the neighbor cell 300b of the first SIM.

At step 1012, if the reselection criterion triggers and evaluates, as per standard procedure, the DSDS device 302 changes the serving cell and camps onto the reselected cell of the first SIM.

At step 1014, the DSDS device 302 does not trigger area update procedure if it is determined that the area has changed, but not in the registered list.

At step 1016, the call is active on the second SIM and no search are triggered on the first SIM.

At step 1018, after the call disconnection, for the first SIM, the DSDS device 302 camps onto the selected or registered candidate neighbor cell and triggers the area update procedure based on the currently selected cell.

At step 1020, the idle mode procedure for the first SIM and the second SIM is performed.

Figure 11:
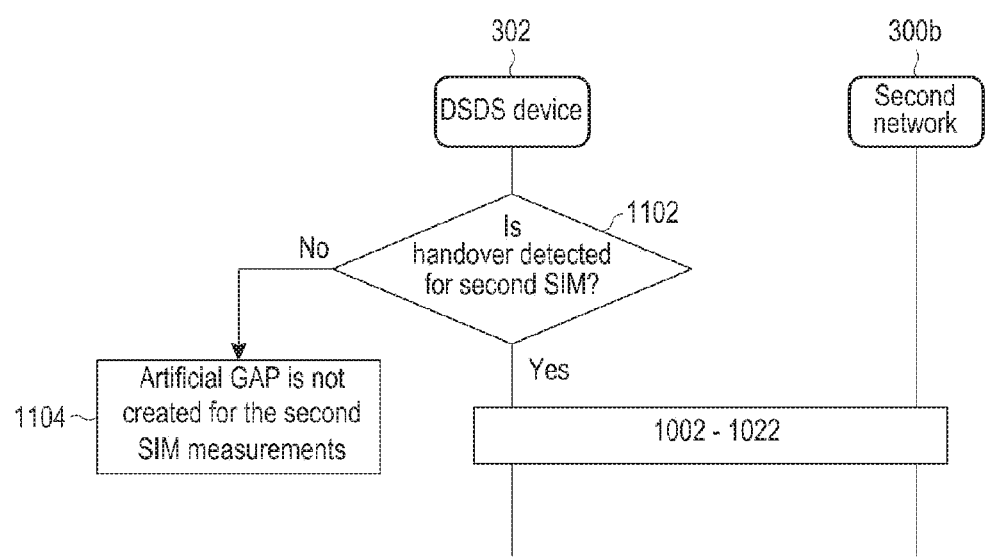
FIG. 11 is a sequence diagram illustrating a method for creating virtual gap when the handover of the second SIM is detected, according to an embodiment of the present disclosure.

FIG. 11 is a sequence diagram for creating virtual gap when the handover of the second SIM is detected, according to an embodiment of the present disclosure. The signaling sequence depicts communication between the DSDS device 302 and the serving cell 300a.

At step 1102, the DSDS device 302 determines whether the handover is detected for the second SIM. If it is determined, at step 1102, that the handover is not detected for the second SIM, at step 1104, the artificial GAP is not created for the second SIM, as its likelihood that no cell change is expected for the second SIM. If it is determined, at step 1102, that the handover is detected, steps 1002 1022 are performed as described above.

The mobility of the DSDS device 320 is initially detected. As long as the DSDS device 302 is under the coverage of same Global System for Mobile Communications (GSM) or other RAT cell in the second SIM, the neighbor cell 300a of the first SIM remains same. If the DSDS device 302 detects mobility i.e., performs handover on the second SIM and changes the serving cell for the second SIM, the neighbor cell for the first SIM may need to be re-evaluated. The DSDS device 302 created GAP is triggered only after the mobility detection in order to perform the cell selection on the first SIM.

Figure 12:
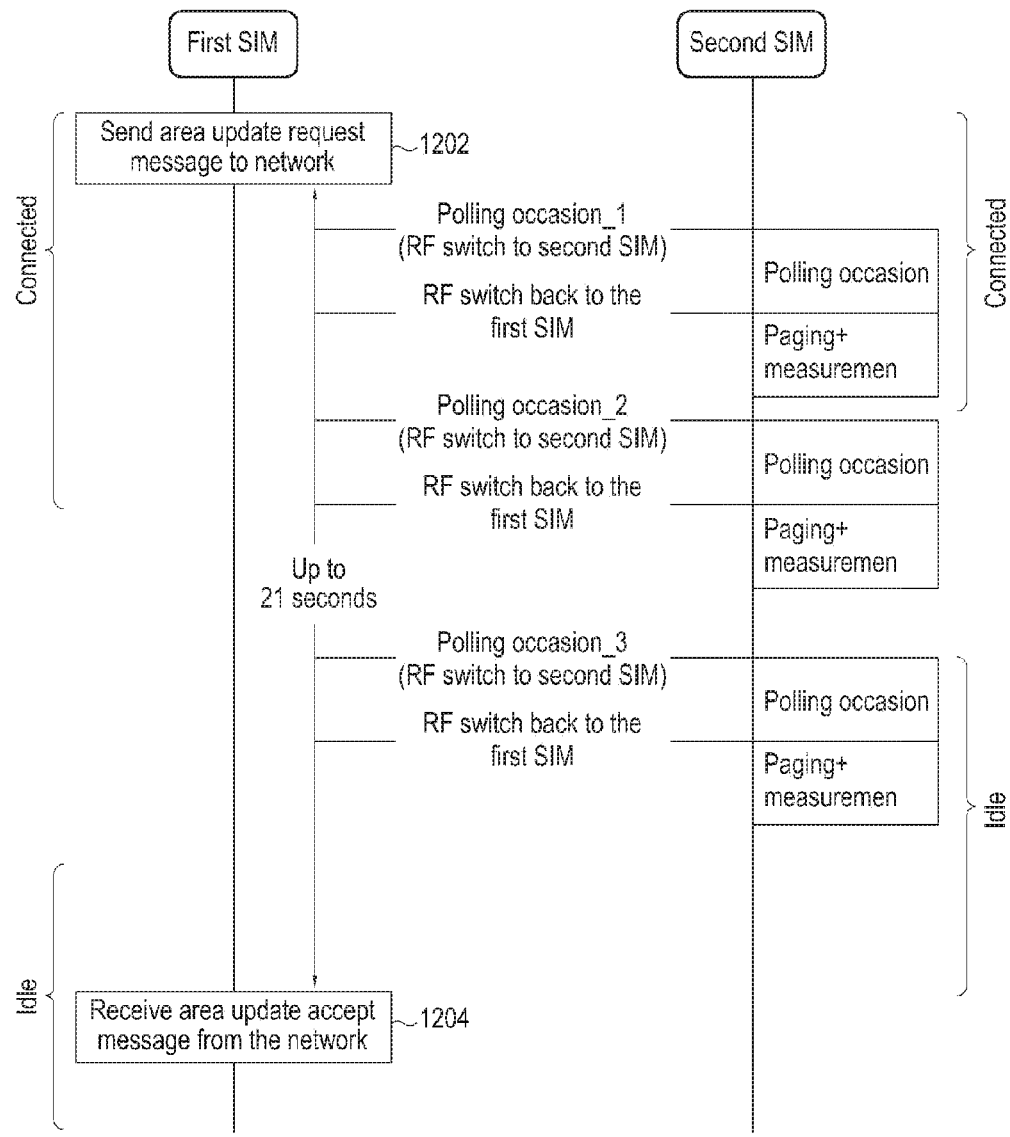
FIG. 12 is a sequence diagram illustrating a method for sharing an RF transceiver with a second SIM, while an area update procedure is ongoing on a first SIM, according to an embodiment of the present disclosure.

FIG. 12 is a sequence diagram 1200 for sharing an RF transceiver with the second SIM, while the area update procedure is ongoing on the first SIM, according to an embodiment of the present disclosure; this scenario is designed to protect connected mode paging, which is in contrast to idle mode paging, where the polling occasion is known prior. The connected mode paging is not easy to manage since there is no predefined occasion to check the paging on the second SIM. By considering the complexity of the connected mode paging, the polling occasion is proposed, which is constrained by the link ability to sustain with the packet drop on the second SIM. The polling occasion is measured based on the link metric on the first SIM, where the link metric is measured as described in the FIG. 12. Based on the link metric performance, the polling occasion is driven. Further, the link metric is associated with % BLER and % NACK transmission on all HARQ process.

In an example, BLER polling occasion is directly proportional to % HARQ_NACK, and % BLER, which results in larger polling occasion. The polling occasion also associated with the link metric at the second SIM, which is, inversely proportional to the HARQ_NACK ratio and % BLER, at the second SIM, which, if the link metric at the second SIM is poor, the polling occasion will be shorter. The polling occasion=F (first SIM (HARQ_NACK, BLER), second SIM (HARQ_NACK, BLER)). The polling occasion is designed to consider the link metric at the first SIM and the second SIM.

At step 1202, as per the proposed mechanism, consider a scenario where the area update is ongoing on the first SIM and where the first SIM sends the area update request message to the network. As the area update is ongoing on the first SIM, which is a priority signaling and can preempt the RF switch in the DSDS design, a paging miss may result in the connected mode on the second SIM.

While the area update is ongoing on the first SIM, the DSDS device 302 calculates the polling occasion-1 and switches the RF to the second SIM. After receiving the polling occasion-1, the DSDS device 302 checks the polling occasion on the second SIM in addition to intra-frequency measurements before switching back the RF to the first SIM. Similarly, polling occasion-2 and polling occasion-3 is calculated, and the DSDS device 302 checks for the polling occasion on the second SIM in addition to intra-frequency measurements before switching back the RF to the first SIM.

At step 1204, the first SIM receives the area update accept message from the network.

Figure 13:
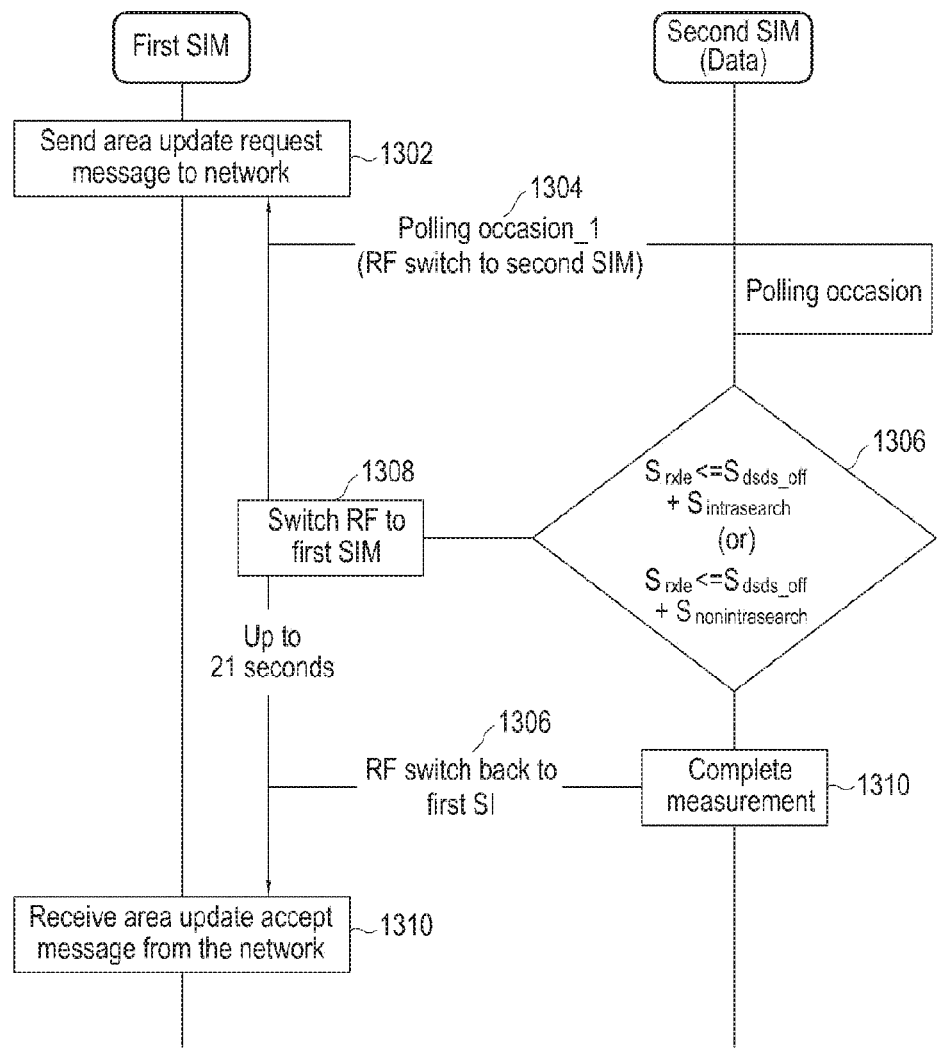
FIG. 13 is flow-chart illustrating a method for sharing an RF transceiver with a second SIM, while an area update procedure is ongoing on a first SIM, according to an embodiment of the present disclosure.

FIG. 13 is a sequence diagram for sharing the RF transceiver with the second SIM while the first SIM is performing the area update procedure, according to an embodiment of the present disclosure.

At step 1302, the controller unit 310 of the DSDS device 302 sends the area update request message to the network, where the antenna 306 (i.e., RF transceiver) is used by the first SIM to perform the area update procedure. The area update can be a Location Area Update (LAU), a Routing Area Update (RAU), or a Tracking Area Update (TAU).

At step 1304, after determining that the data on the signaling bearer link entity associated with the first SIM is unavailable, the controller unit 310 switches the antenna 306 (i.e., RF transceiver) from the first SIM to the second SIM. While switching the antenna 306 to the second SIM, the polling occasion is created for the second SIM based on the DRX period of the second SIM and at least one parameter of the first SIM. The parameter may be an instantaneous signal, a statistical signal, and/or bearer conditions.

At step 1306, the controller unit 310 determines whether the cell selection receive level value (SrxLev) meets (i.e., less than or equal to) a metric value when the antenna 306 is switched to the second SIM. The metric value is a sum of a cell selection DSDS offset value (Sdsds_offset), and one of a threshold for intra-frequency measurement (i.e., Sintrasearch) and a threshold for non intra-search frequency measurement (i.e., Snonintrasearch).

At step 1308, after determining the cell selection receive level value is greater than the metric value, the controller unit 310 switches the antenna 306 (i.e., RF transceiver) from the second SIM to the first SIM.

At step 1310, after determining the cell selection receive level value is less than or equal to the metric value, the controller unit 310 completes the measurement on the second SIM.

At step 1312, after completing the measurements on the second SIM, the controller unit 310 switches the antenna 306 from the second SIM to the first SIM.

At step 1314, after switching the antenna 302 to the first SIM, the controller unit 310 receives the area update accept message from the network.

Figure 14:
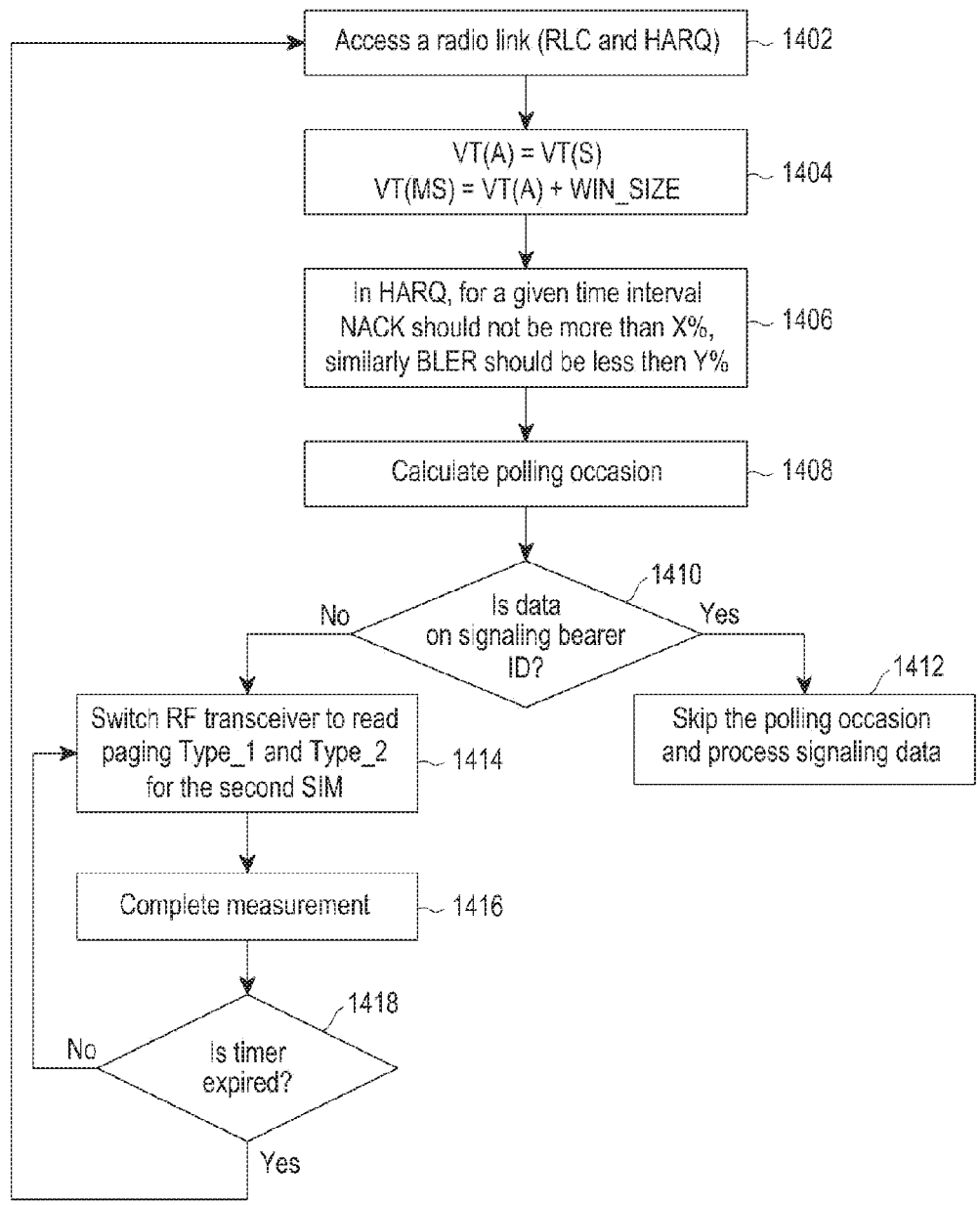
FIG. 14 is a flow-chart illustrating a method for sharing the RF transceiver with the second SIM while NAS signaling is performed at the first SIM, according to an embodiment of the present disclosure.

FIG. 14 is a flowchart illustrating a method for sharing the RF transceiver with the second SIM while NAS signaling is performed at the first SIM, according to an embodiment of the present disclosure. At step 1402, the DSDS device 302 accesses the radio link condition. The input parameters at the DSDS device 302 side such as HARQ ACK/NACK, BLER, or the like are obtained and are considered to evaluate the radio link condition. Further, RLC (Radio Link Control) state variables, which track the flow control in a sliding window also provides coarse level information regarding the health of the radio link.

At step 1404, the DSDS device 302 measures the transmission window VT_A, during the radio link evaluation, which should be equal to in-sequence VT_S. So, VT(A)=VT(S), which is a state the health of the radio condition, where a transmitted packet has been acknowledged and no retransmission is performed at the RLC layer. Further, VT (MS) serves as the higher edge of the transmitting window and should be equal to VT_S+WIN_SIZE, which states that all packets are acknowledged and no window space has been utilized by re-transmission.

After identifying the health of the radio link at the RLC level, at the MAC layer, the data packets are protected by the HARQ, so any errors in the transmission would result in HARQ_NACK at the MAC layer, and HARQ retransmission % for all HARQ process should not be greater than 10% in order to disconnect the second SIM temporarily and measure at least one candidate neighbor cell. At the same time, to measure the RX, generated NACK on each HARQ process after decoding should not be greater than 10% in order to the disconnect the second SIM temporarily and measure at least one neighbor cell.

At step 1406, the DSDS device 302 detects, in HARQ, for a given time interval, if NACK is less than or equal to X % and if BLER is less than Y % (the X and Y are example percentage values).

At step 1408, the DSDS device 304 calculates the polling occasion. The polling occasion can be designed as an integer multiple of the paging occasion on the second SIM, i.e., the polling occasion=K×Paging occasion on the second SIM. The integer multiple "K" is a dynamic parameter and depends upon the quality of the radio link. The DSDS device 304 evaluates the radio link before deciding the polling occasion. The integer multiple "K" will increase with the degraded quality of the radio link. Thus, the integer multiple "K" is inversely proportional to the BLER, where K∝1/BLER.

If it is determined, at step 1410, that the data on signaling bearer ID is detected, at step 1412, the DSDS device 304 skips the polling occasion and processes the signaling data received on the first SIM. Before switching the RF transceiver to the second SIM, the DSDS device 304 monitors the signaling bearer radio link entity on the first SIM in order to check the signaling data for NAS signaling. If the signaling data on signaling bearer ID is detected, the DSDS device 304 process the signaling data and skips the polling occasion (i.e., next N polling occasions).

If it is determined, at step 1410, that the data on signaling bearer ID is not detected, at step 1414, the DSDS device 304 switches the RF transceiver to read Paging_Type-1 message and Paging_Type-2 message for the second SIM. After switching the RF transceiver to the second SIM, a sequence of steps are performed, and are explained with reference to FIG. 13. At step 1416, the DSDS device 304 completes the measurement on the second SIM. If it is determined, at step 1418, that the timer is expired, the method is looped back to step 1402. If it is determined, at step 1418, that the timer is not expired, then the method is looped back to step 1416.

Figure 15:
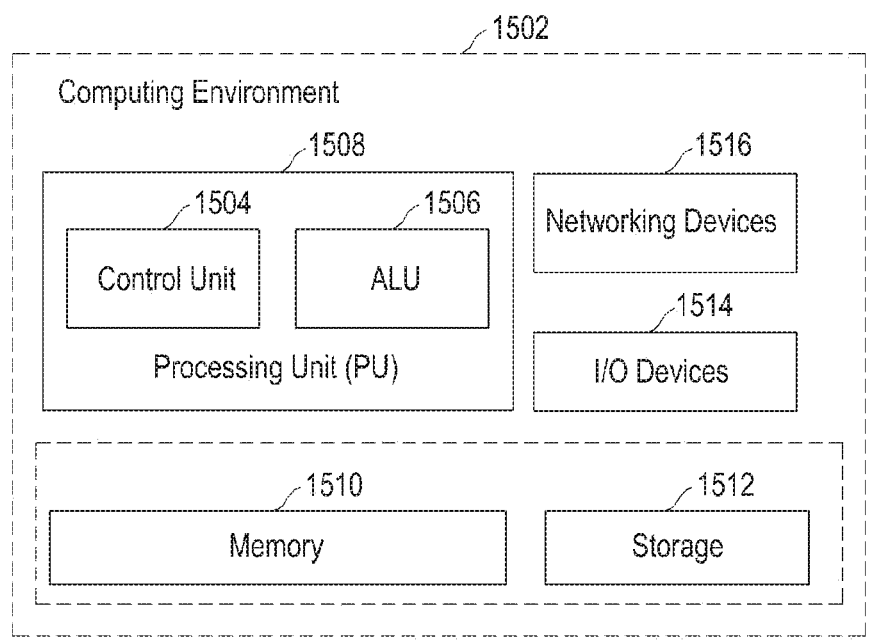
FIG. 15 is a diagram illustrating a computing environment for implementing the method for optimizing cell selection in the DSDS device, according to an embodiment of the present disclosure.

FIG. 15 is a diagram illustrating a computing environment using a method for providing integrity protection in the DSDS device 302, according to an embodiment of the present disclosure. The computing environment 1502 includes at least one processing unit 1508 that is equipped with a control unit 1504 and an Arithmetic Logic Unit (ALU) 1506, a memory 1510, a storage unit 1512, plurality of networking devices 1516 and a plurality Input output (I/O) devices 1514.

The processing unit 1508 is responsible for processing the instructions of the used for carrying out the method providing integrity protection in the DSDS device 302, and the other methods described herein. The processing unit 1508 receives commands from the control unit 1504 in order to perform its processing. Further, any logical and arithmetic operations involved in the execution of the instructions are computed with the help of the ALU 1506.

The overall computing environment 1502 can be composed of multiple homogeneous or heterogeneous cores, multiple CPUs of different kinds, special media and other accelerators.

Further, the components of the computing environment 1502 may be located on a single chip, a System on Chip (SoC) or over multiple chips.

The instructions and codes required for the implementation of the method can be stored in either the memory unit 1510 and/or the storage 1512. At the time of execution, the instructions may be fetched from the corresponding memory 1510 or storage 1512, and executed by the processing unit 1508.

In case of any hardware implementations various networking devices 1516 or external I/O devices 1514 may be connected to the computing environment 1502 to support the implementation through the networking unit and the I/O device unit.

The embodiments disclosed herein can be implemented through at least one software program running on at least one hardware device and performing network management functions to control the elements. The elements shown in FIGS. 2A-15 include blocks which can be at least one of a hardware device, or a combination of hardware device and software units.

While the present disclosure has been shown and described with reference to certain embodiments thereof, it will be understood by those skilled in the art that various changes in form and details may be made therein without departing from the scope of the present disclosure. Therefore, the scope of the present disclosure should not be defined as being limited to the embodiments, but should be defined by the appended claims and equivalents thereof.

What is claimed is:

1. A method for optimizing cell selection in a dual subscriber identification module (SIM) dual standby (DSDS) device, the method comprising:

selecting at least one candidate neighbor cell corresponding to a serving cell currently serving a second SIM among a plurality of candidate neighbor cells of a first SIM from a mapping table of the DSDS device, the mapping table maps each of the plurality of candidate neighbor cells of the first SIM to each of a plurality of serving cells of the second SIM, wherein the first SIM is out of service and the second SIM is in service by the serving cell among the plurality of serving cells of the second SIM; and camping the first SIM onto the at least one selected candidate neighbor cell, while the DSDS device performs a communication activity with the serving cell currently serving the second SIM and wherein the at least one selected candidate neighbor cell is adjacent to the serving cell currently serving the second SIM.

2. The method of claim 1, wherein the mapping table is created by the DSDS device based on a historic mobility pattern of the first SIM and the second SIM.

3. The method of claim 1, wherein the mapping table is stored in a storage in the DSDS device.

4. The method of claim 1, wherein the mapping table is received by the DSDS device from at least one neighbor device when the DSDS device is in one of an idle mode and a connected mode.

5. The method of claim 4, wherein the DSDS device connects with the at least one neighbor device to receive the mapping table using a short range communication.

6. The method of claim 1, wherein the at least one selected candidate neighbor cell is a serving cell of the first SIM after the communication activity associated is completed.

7. The method of claim 1, wherein computer executable program instructions corresponding to steps included in the method are stored in a non-transitory computer readable storage medium.

8. A method for optimizing cell selection in a dual subscriber identification module (SIM) dual standby (DSDS) device, the method comprising:

selecting at least one candidate neighbor cell corresponding to a serving cell currently serving a second SIM among a plurality of candidate neighbor cells of a first SIM from a mapping table of the DSDS device, the mapping table maps each of the plurality of candidate neighbor cells of the first SIM to each of a plurality of serving cells of the second SIM during a gap allocated to the second SIM, wherein the first SIM is out of service and the second SIM is in service by the serving cell among the plurality of serving cells of the second SIM; and camping the first SIM onto the at least one selected candidate neighbor cell, while the DSDS device performs a communication activity with the serving cell currently serving the second SIM, wherein the at least one selected candidate neighbor cell is adjacent to the serving cell currently serving the second SIM.

9. The method of claim 8, wherein the gap is one of a measurement gap, a compression mode gap, and an artificial gap.

10. The method of claim 9, wherein the DSDS device creates the artificial gap in response to determining whether statistics of hybrid automatic repeat request (HARQ) non-acknowledgement (NACK) is within a block error rate (BLER) threshold, wherein the artificial gap maintains retransmission within the BLER threshold.

11. The method of claim 9, wherein a residual time in the compression mode gap is used for selection of the at least one candidate neighbor cell for the first SIM.

12. The method of claim 8, wherein computer executable program instructions corresponding to steps included in the method are stored in a non-transitory computer readable storage medium.

13. A dual SIM dual standby (DSDS) device for optimizing cell selection, the DSDS device comprising a controller unit configured to:

select at least one candidate neighbor cell corresponding to a serving cell currently serving a second SIM among a plurality of candidate neighbor cells of a first SIM from a mapping table of the DSDS device, the mapping table maps each of the plurality of candidate neighbor cells of the first SIM to each of a plurality of serving cells of the second SIM, wherein the first SIM is out of service and the second SIM is in service by the serving cell among the plurality of serving cells of the second SIM; and camp the first SIM onto the at least one selected candidate neighbor cell, while the DSDS device performs a communication activity with the serving cell currently serving the second SIM, wherein the at least one selected candidate neighbor cell is adjacent to the serving cell currently serving the second SIM.

14. The DSDS device of claim 13, wherein the mapping table is created by the controller unit based on a historic mobility pattern of the first SIM and the second SIM.

15. The DSDS device of claim 13, wherein the mapping table is received by the controller unit from at least one neighbor device when the DSDS device is in one of an idle mode and a connected mode.

16. The DSDS device of claim 15, wherein the controller unit is further configured to connect with the at least one neighbor device to receive the mapping table using a short range communication.

17. The DSDS device of claim 13, wherein the at least one selected candidate neighbor cell is a serving cell of the first SIM after the communication activity is completed.

\* \* \* \* \*